United States Patent

[11] 3,623,073

[72] Inventors Desmond Wheable;
Stephen H. Outram, both of Farnborough, England

[21] Appl. No. 822,581
[22] Filed May 7, 1969
[45] Patented Nov. 23, 1971
[73] Assignee The Solartron Electronic Group Limited
Farnborough, England
[32] Priority Dec. 20, 1968
[33] Great Britain
[31] 60,791/68

[54] ANALOGUE TO DIGITAL CONVERTERS
8 Claims, 2 Drawing Figs.

[52] U.S. Cl. .......... 340/347 NT, 324/99
[51] Int. Cl. .......... H03k 13/02
[50] Field of Search .......... 340/347, 347 NT; 235/183; 328/151; 324/99, 111

[56] References Cited

UNITED STATES PATENTS

| | | | |
|---|---|---|---|
| 3,500,384 | 3/1970 | Naydan .......... | 340/347 |
| 3,458,809 | 7/1969 | Dorey .......... | 340/347 |
| 3,436,756 | 4/1969 | Myers .......... | 340/347 |
| 3,414,898 | 12/1968 | Barton .......... | 340/347 NT |

*Primary Examiner*—Maynard R. Wilbur
*Assistant Examiner*—Jeremiah Glassman
*Attorneys*—William R. Sherman, Stewart F. Moore, Jerry M. Presson and Roylance, Abrams, Berdo and Kaul

ABSTRACT: In known dual ramp digital voltmeters the ramp up (as the input voltage is integrated) is followed immediately by the ramp down (as the opposing reference voltage is integrated). In this invention there is a small but deliberate delay between ramp up and ramp down which allows conditions to settle and provides an interval during which a reliable polarity determination can be effected.

INVENTORS
DESMOND WHEABLE
STEPHEN HENRY OUTRAM
BY
ATTORNEY

ANALOGUE TO DIGITAL CONVERTERS

This invention relates to dual ramp analog to digital converters, including dual ramp digital voltmeters, that is to say converters in which an input voltage is applied an integrating circuit during a first interval defined by a number of clock pulses, whereafter an opposing reference voltage is substituted for the input voltage (or an opposing reference voltage of greater magnitude than the input voltage is applied simultaneously therewith) so as to restore the output of the integrating circuit during a second interval to the level which obtained at the beginning of the first interval, clock pulses being counted in the second interval to give a digital measure of the input voltage. Such analog to digital converters are well known and disclosed in U.S. Pat. Nos. 3,051,939 and 3,316,547 but difficulties arise from errors associated with switching the voltages to the integrating circuit and in determining the polarity of the input voltage, particularly at low levels.

In accordance with one embodiment of this invention, the first interval is defined by a fixed number of clock pulses, as it is in the said U.S. Pat. No. 3,316,547, and delay means are operative at the end of the first interval to delay the application of the reference voltage to the integrating circuit, and hence the onset of the second interval. The delay can be small relative to the duration of the first and second intervals, e.g., up to a few tens of microseconds, the first interval being typically 20 milliseconds, but such a delay suffices to allow the integrating circuit to settle after removing the input voltage.

It is preferred to effect polarity determination from the output level of the integrating circuit during the delay, when conditions are stable. In known voltmeters and other analog to digital converters this determination has to be made during the first interval, but when the input voltage is very small, noise such as mains noise can then upset the polarity determination—i.e., the noise can reverse the sign of the output at the crucial time (when the polarity sensitive circuitry actually selects the reference signal polarity) and give the wrong polarity decision, even though the noise is integrated out over the whole first interval by the known technique of making this interval equal to the mains period (20 ms. for 50 Hz. mains or 16⅔ ms. for 60 Hz. mains). Preferably the said delay comprises a first delay, during which the integrator circuit output settles and following which the polarity determination is made and the required reference voltage polarity is selected, and a subsequent delay which gives time for input conditions to settle following the reference polarity selection.

The invention will be described in more detail, by way of example, with reference to the accompanying drawings, in which.

Figures 1, 2:
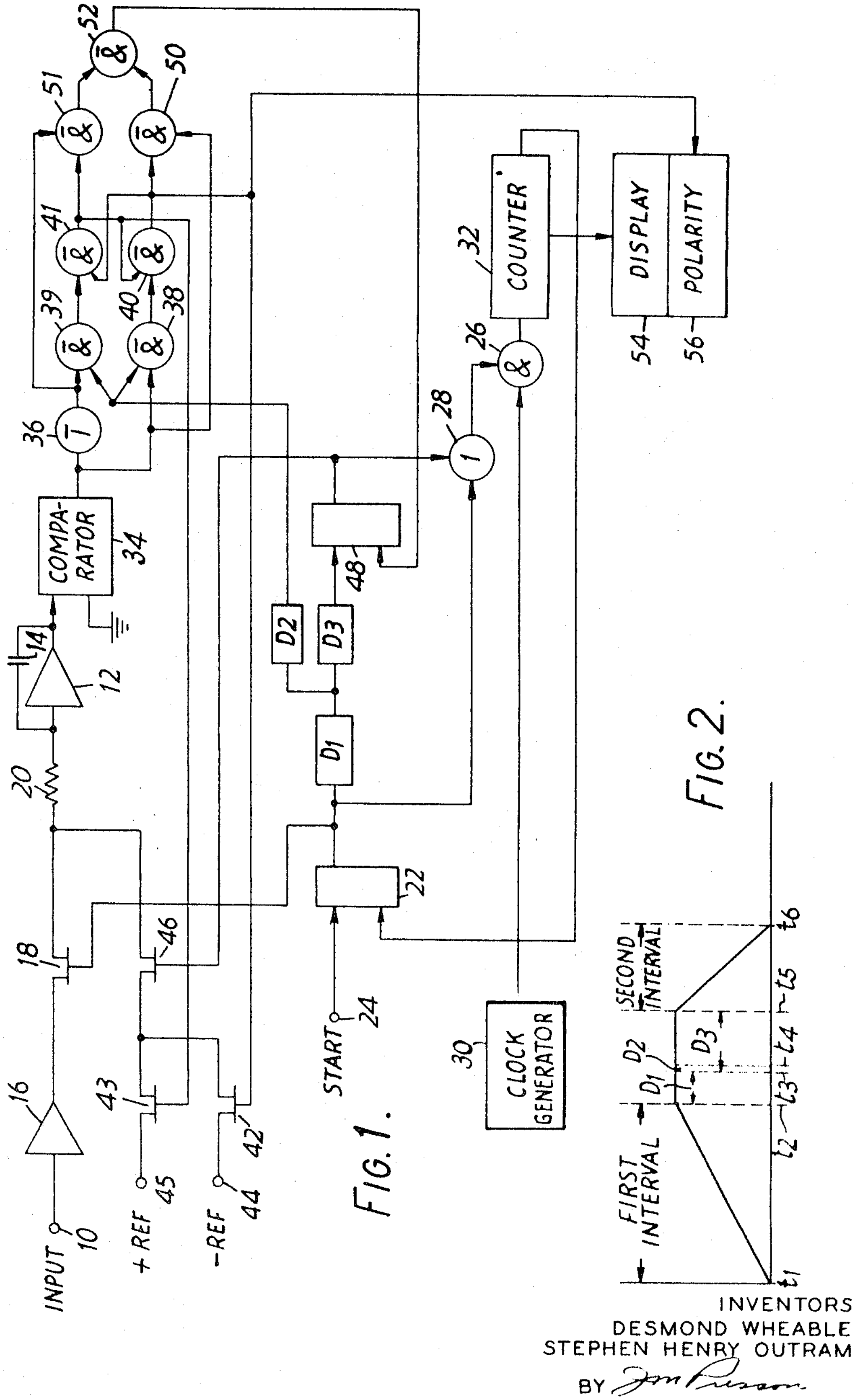
FIG. 1 is a block diagram of one embodiment.
FIG. 2 shows an explanatory waveform, namely the integrator circuit output level.

In FIG. 1 all switches are shown as field effect transistors. The unknown input voltage is applied to a terminal 10 which is connected to an integrating amplifier 12 with feedback capacitor 14 through an input amplifier 16, a switch 18 and an input resistor 20. The switch 18 is closed at time $t_1$, marking the beginning of the said first interval, by a bistable flip-flop 22 which is switched "true" by a start pulse applied in known manner to an input 24, the words "true" and "false" being used herein in the customary way to designate the two different states of binary logic circuits and the two different values of binary logic signals. The output of the switched flip-flop 22 also enables and AND gate 26, through an OR gate 28 and clock pulses are therefore applied from a clock pulse generator 30 to a counter 32. The counter counts a predetermined number of clock pulses and then provides an output for resetting the flip-flop 22 to "false," the counter then being in a datum state which may be zero. This occurs at time $t_2$ at which time the output of the integrating amplifier 12 is as shown in FIG. 2.

The "true" output of the flip-flop 22 resets to open the switch 18 and initiates a delay $D_1$ which may be 10 microseconds, giving sufficient time for the integrator output to settle following the opening of the switch 18. $D_1$ is shown in FIG. 2 commencing at $t_2$ and ending at $t_3$. It may be mentioned that the time scale from $t_2$ to $t_5$ in FIG. 2 is grossly exaggerated, relative to $t_1$ to $t_2$and $t_5$ to $t_6$. At $t_3$ it can safely be assumed that the output of the integrating amplifier 12 is stable and accordingly a known comparator 34, such as a differential amplifier followed by a trigger circuit, tests whether the said output is above or below ground level, assumed to be the datum, and provides a true polarity output if the integrated input voltage was positive and a false output if the voltage was negative. The polarity output is inverted by a NOR gate 36.

Two further delays are provided at the end of $d_1$ by delays $D_2$ and $D_3$ which may be of 1 microsecond and 20 microseconds respectively (terminating at $t_4$ and $t_5$ in FIG. 2). Two NAND gates 38 and 39 receive 1 microsecond "true" pulses from the delay $D_2$. All NAND gates herein provide a "-false" output only when both inputs are "true." The gates 38 and 39 are further responsive to the noninverted and inverted polarity outputs respectively and the gate 38 provides a "false" output if the input voltage was positive, while the gate 39 provides a "false" output if the input voltage was negative. The false output sets a polarity flip-flop composed of NAND gates 40 and 41, these gates respectively providing "true" outputs when the input voltage was positive and negative respectively.

For positive input voltage the output of gate 50 is now "false" because the output of comparator 34 and the output of gate 40 are both time. The output of gate 51 however is now true since the outputs of both gates 36 and 41 are false. For negative polarity the output of gate 50 is true and that of gate 51 is false. In both conditions the output of a further NAND gate 52 is therefore true.

If the input voltage was positive, the "true" output of the gate 40 closes a switch 42 for applying a negative reference voltage from a terminal 44 to the amplifier 12, when a further switch 46 is closed. If the input voltage was negative, the "-true" output of the gate 41 closes a switch 43 for applying a positive reference voltage from a terminal 45 to the amplifier 12, again when the switch 46 is closed. The switch 46 is now however closed until $t_5$ , i.e. the end of the delay provided by $D_3$, when a bistable flip-flop 48 is set. This further delay gives time for satisfactory completion of the polarity determination and selection of the required reference voltage polarity.

Further, $t_5$ marks the commencement of the said second interval in which the selected reference voltage restores the integrator output to datum. Clock pulses are again counted because the output of the flip-flop 48, in addition to closing the switch 46, enables the AND gate 26 through the OR gate 28.

The end of the second ramping interval is marked by the integrator output going through the datum level at $t_6$ (FIG. 2), at which time the logical level of the comparator polarity output changes, causing the outputs of both of the two NAND gates 50 and 51 to become "true." Accordingly the further NAND gate 52 receives two "true" inputs and its outputs goes "false" and resets the flip-flop 48. The counting of clock pulses ceases and the number in the counter represents the magnitude of the input voltage. This number is displayed by conventional means on a display device 54, e.g., on Nixie tubes fed by a decoder and the counter 32 is reset in known manner ready for the next measurement. The polarity of the input voltage is displayed in known manner by a polarity display 56 responsive to the output of the gate 40. The display 56 can illuminate a minus sign when the output of the gate 40 is "false."

If the number of pulses counted to determine the first interval is not such that the counter holds zero at $t_2$, the counter can conveniently be restored to zero by the pulse from $D_2$.

The delays $D_1$, $D_2$ and $D_3$ may be monostable multivibrators or they may be derived in purely digital manner from the clock pulses, i.e., each delay is established by counting a predetermined number of clock pulses.

The invention can be applied when, in accordance with known techniques, the clock pulses are counted in differing manners during the second interval, depending on the polarity of the input voltage, e.g., for linearizing transducer outputs. It is then essential to know the input polarity in advance of the second interval in order to select the mode of counting. The invention makes this possible and the delay between the polarity determination at $t_3$ and the beginning $t_5$ of the second interval can be extended as necessary by increasing the delay $D_3$.

Since this invention initiates the described delays as a result of the counter 32 registering a particular pulse count, the principles of the invention are equally applicable to analog to digital converters in which the first interval is of variable duration such as in the case of U.S. Pat. No. 3,051,939. Hence the invention is applicable not merely to so-called dual-ramp or dual-slope converters but generally, as will be apparent to those skilled in the art, to analog to digital converters controlled by a counter to operate in two countertimed intervals.

We claim:

1. A dual ramp analog to digital converter comprising an integrating means, a source of clock pulses, means for counting a first predetermined number of clock pulses to define a first interval, and for counting a second number of clock pulses during a second interval, the second number of pulses providing a digital representation of the analog signal magnitude and the counting means signalling the end of the first interval, means for applying the analog signal to said integrating means during said first interval to cause the output of said integrating circuit to deviate from a datum level, a source of a reference signal means for applying said reference signal to said integrating means in a direction to restore said output to said datum level during said second interval following said first interval, means responsive to said integrating means output to detect restoration thereof to said datum level to terminate said second interval, and delay means responsive to said counting means signalling the end of said first interval for disconnecting the analog signal from said integrating means and for time-delaying the application of said reference signal to said integrating means, to provide a delay between the end of said first interval and the beginning of said second interval.

2. A dual ramp analog to digital converter according to claim 1, wherein said integrating means is an integrating amplifier with a feedback capacitor.

3. An analog to digital converter comprising an integrating means, a source of clock pulses, means for counting a first number of clock pulses to signal the end of a first interval, means for applying an analog signal to said integrating means during said first interval to cause the output of said integrating means to deviate from a datum level, sources of first and second reference signals of respective opposite polarities, means for detecting the polarity of said integrating means output, storing means for storing the detected polarity and for correspondingly selecting one of said reference signals, means for applying the selected reference signal to said integrating means to restore said output to datum during a second interval following said first interval, means for causing said counting means to count said clock pulses during said second interval to provide a digital representation of the magnitude of said analog signal, first delay means responsive to said counting means signalling the end of said first interval to render said storing means operative to store the detected polarity a predetermined time after the end of said first interval, and second delay means for delaying the application of said selected reference signal to said integrating means until a predetermined time after said storing means is rendered operative.

4. An analog to digital converter according to claim 3, wherein said first interval is defined by a fixed number of clock pulses.

5. An analog to digit converter according to claim 3, wherein said reference signals are voltages of respective opposite polarities and wherein said means for applying apply the selected reference voltage continuously to said integrating means throughout said second interval.

6. An analog to digital converter comprising integrating means, a source of clock pulses, counting means for counting said pulses, means for applying an analog input to said integrating means to charge said integrating means to a level determined by an analog input during a first interval, means for terminating said first interval when said counting means assumes a preselected count and for removing the analog input from said integrating means, delay means responsive to said counting means to provide a predetermined delay following said first interval, and means responsive to said delay means to initiate a second interval following said delay and operative in said second interval to discharge said integrating means to provide a digital measure of said analog input.

7. A method of converting an analog signal to a digital signal comprising the steps of applying an analog input signal to the input of a linear integrating device and integrating the analog input signal for a fixed, predetermined first interval of time; disconnecting the input analog signal from the input of the storage device to defer the termination of said first time interval and holding the accumulated signal for a predetermined delay interval at essentially the level reached at said termination of the first interval; applying a reference signal to the storage device to remove the accumulated signal therefrom during a second interval the duration of which is dependent upon the magnitude of the analog input signal; producing clock pulses and counting the pulses produced during said second interval to provide a digital measure thereof; and determining the polarity of the accumulated signal during the delay interval.

8. A method of converting an analog signal magnitude into a digital representation thereof comprising the steps of, applying the analog signal to linear integrating means whereby said means generates a first ramping waveform which departs from a signal level, clocking the time at least from the instant the waveform departs from said level, removing the analog signal from said integrating means after a first predetermined interval of time is clocked, clocking a second time interval of sufficient duration to permit a determination to be made regarding the polarity of said analog signal, and then applying a signal of constant magnitude and of opposite sense to said analog signal to said integrating means whereby a second ramping waveform directed toward said signal level is generated, and clocking the time for said second ramping waveform to attain said signal level to provide a digital representation of the analog signal magnitude.

* * * * *